United States Patent [19]

Hsu

[11] 4,016,337
[45] Apr. 5, 1977

[54] WATER-DISPERSIBLE COMPOSITION AND METHOD FOR PRODUCTION

[75] Inventor: Jau Yann Hsu, Brookfield, Conn.

[73] Assignee: Societe d'Assistance Technique Pour Produits Nestle S.A., Lausanne, Switzerland

[22] Filed: Feb. 13, 1976

[21] Appl. No.: 657,758

[52] U.S. Cl. .............................. 426/99; 426/307; 426/453

[51] Int. Cl.² ..................... A23L 1/195; A23C 9/16

[58] Field of Search ............ 426/99, 307, 654, 423, 426/442, 453

[56] References Cited

UNITED STATES PATENTS

| | | | |
|---|---|---|---|
| 3,199,985 | 8/1965 | Mourey | 426/99 |
| 3,433,650 | 3/1969 | Block et al. | 426/99 |
| 3,692,529 | 9/1972 | Rychman | 426/99 X |
| 3,840,685 | 10/1974 | Lyall et al. | 426/99 X |

OTHER PUBLICATIONS

Hawley, G. G. "The Condensed Chemical Dictionary", Van Nostrand Reinhold Co., New York, p. 783 (1971).

Primary Examiner—Raymond N. Jones
Assistant Examiner—R. A. Yoncoskie
Attorney, Agent, or Firm—Watson Leavenworth Kelton & Taggart

[57] ABSTRACT

A water-dispersible composition is disclosed. This composition contains co-agglomerates of finely-divided particles of a normally non-dispersible material and a silicon dioxide flow agent having a thin coating of an emulsion of edible fat and glycerol. The composition may optionally include flavorants and other additives.

12 Claims, No Drawings

WATER-DISPERSIBLE COMPOSITION AND METHOD FOR PRODUCTION

BACKGROUND OF THE INVENTION

Throughout the arts, there are encountered instances in which it is desired to produce aqueous solutions or dispersions containing a material or materials difficult to disperse directly in water. Upon addition to aqueous liquids, these materials ordinary form lumps which may not disintegrate even under the most severe conditions of admixture.

It is an object of this invention to modify these non-dispersible materials through a combination of additives which increase the speed with which they are dispersed in aqueous medium.

It is a further object of this invention to increase the completeness of dispersion of these difficult to disperse compositions in aqeuous medium, so as to permit the production of essentially homogeneous solutions and-/or dispersions.

This invention also seeks to produce dry compositions containing ordinarily dispersible and nondispersible material, but which are rendered completely dispersible in aqueous liquid so as readily to permit the production of aqueous based foods and other products.

These, and other objects and advantages as are described in this specification, are achieved through the present invention.

DESCRIPTION OF THE INVENTION

This invention is concerned with the production of aqueous dispersions and/or solutions containing materials which are difficult to place in these forms. These materials are well-known in the art. They comprise solids which are usually edible and of predominantly hydrophobic character. Examples of essentially non-dispersible materials include dehydrated cheeses, caseinates, protein isolates (particularly soy), milk powders, raw and precooked flours (such as wheat or pea flour) and the like.

There exist many uses, such as in soups, sauces, prepared dishes and other food products, for the aqueous dispersions and solutions of this invention. The desirability of ready dispersion of these materials and of compositions which contain them is also self-evident. It simplifies their conversion from a stable and/or compact dry form into that in which they are eventually utilized.

Another class of common, non-dispersible materials is thickening agents. These materials—such as starches (particularly pre-gelatinized starch), gums and the like—are commonly employed to increase the viscosities of aqueous solutions. Although common in glues, paints and like compositions, they are most often utilized in foods to provide desirable body and texture.

In the context of this invention, a "non-dispersible material" is defined as a powdered solid which, upon being added to 80° C water in a desired amount capable of producing an essentially homogeneous liquid phase, will not do so after 20 seconds of hand-stirring. Instead of a single homogeneous phase, separate solid and liquid phases—usually containing substantial, sticky lumps—result.

With many compositions, individual constituents which would alone be dispersible, are additive in their effect and product a non-dispersible material. In addition, dispersibility is dependent upon the weight ratio of solid material to aqueous liquid in which it is to be dispersed. Thus, while the non-dispersible material may be an essentially pure composition or compound, it may also comprise two or more constituents (whether or not they would alone be dispersible).

The objects and advantages of this invention do not require that all of the non-dispersible material of a given composition be treated as described hereinafter. Because of the ratio and additive properties noted above, treatment of only a fraction of that material is often sufficient to render the entire composition water-dispersible.

In accordance with this invention, compositions containing a material which would otherwise not be water-dispersible are readily converted into aqueous dispersions and/or solutions through a unique co-action of silicon dioxide flow agent and an emulsion of edible fat and glycerol. In order to achieve this co-action, these additives must be combined with non-dispersible material of the composition in a particular manner. More specifically, it is necessary that finely-divided particles of the non-dispersible material and of the silicon dioxide be co-agglomerated before the emulsion is coated over their external surfaces.

By "co-agglomerates" are meant physically—as opposed to chemically—bonded particles of the non-dispersible material with particles of silicon dioxide. This agglomeration is believed to be achieved through hydrogen-bonding occurring between the respective surfaces of dissimilar constituent particles. It is not intended, however, to limit this invention by such theory inasmuch as it is known that, by whatever mechanism this bonding is achieved, an intimate adhesion between the particles is obtained.

These co-agglomerates may be composed of up to 8%, preferably from 0.5 to 5% of silicon dioxide by weight of non-dispersible material. Modification of silicon dioxide concentration within these limits may be desirable where the ultimate aqueous product is intended for consumption. In many jurisdictions, the permissible concentration of silicon dioxide in a food is limited by law (at the present time, for example, only 2% by food weight is allowed in the United States). Consequently, the desired amount of silicon dioxide in the agglomerates may be limited by the total weight of other materials, including the aqueous liquid, in the ultimate product.

As a result of this formation of co-agglomerates of non-dispersible material and silicon dioxide flow agent, the emulsion coating covers only the external portion of the entire surface of a given particle. This covered "external" portion is the outer surface of the co-agglomerate. Thus this external surface does not include that portion of any given particle of non-dispersible material or silicon dioxide which is contingent with another particle and by virtue of which the two dissimilar particles are bonded into a co-agglomerate.

To form an external coating only, the emulsion is added to already formed co-agglomerates of non-dispersible material and silicon dioxide. Only after an intimate admixture of these particulate materials has been formed, so as to permit the production of co-agglomerates, is the emulsion coating applied. Most conveniently, this application is performed by spraying onto the co-agglomerates. Blending or admixture of the resultant composite is then preferred to ensure uniformity of coating.

The reason for the criticality of this sequence of processing steps appears to reside in the interference with co-agglomerate production which otherwise occurs. In the absence of pre-agglomeration, the particles are essentially completely coated by the emulsion. This coating insulates the particles and prevents or impairs the surface adhesion or bonding between particle surfaces necessary to produce the present co-agglomerates.

It has been discovered that finely-divided particles increases the ease of dispersion and produce aqueous compositions of maximum homogeneity. It is therefore desired that the silicon dioxide be extremely finely-divided, having an average particle size (diameter) of less than about 5 micron, preferably less than 0.5 micron, and most preferably less than 0.05 micron. Silicon dioxide particles of these sizes are readily available as commercial flow agents.

It is similarly desirable to use finely-divided particles of the non-dispersible material in forming these coagglomerates. Although their particle sizes vary greatly, depending upon the specific material employed, the smallest are preferred. In many cases, it is advantageous to grind or otherwise comminute commercially available forms of non-dispersible material in order to obtain particles having diameters of less than 100 micron, preferably less than 40 micron, and which therefore will produce more finely-divided co-agglomerates.

The conditions under which the non-dispersible material the silicon dioxide are combined to produce coagglomerates also affects the ease and homogeneity of dispersion. These particles are desirably blended together (preferably in the absence of any other composition ingredients) to provide intimate admixture and minimize likeparticle agglomeration. High-shear mixing has been found to be particularly useful for these functions. Such mixing also produces very small co-agglomerates, which are still more readily dispersible.

The amount of fat/glycerol emulsion added to the co-agglomerates should be sufficient to coat their external surfaces. No benefit is obtained from excess, non-coating emulsion. Accordingly, from about 10 to 35%, preferably 15 to 30%, of emulsion by weight of co-agglomerates to be coated is ordinarily utilized.

This emulsion is composed of edible fat and glycerol provided in proportions which maximize both particle coatability and improve dispersibility. Preferably, this fat/glycerol proportion is within the range of from 1:1 to 1:4 by weight.

The fat (which must be in liquid form) and glycerol are readily transformed into emulsions by rapid stirring, shaking or other agitation. If desired, these emulsions may additionally include a small amount of emulsifier. This stabilizes the emulsion and improves the texture and appearance of the eventual reconstituted product. Thus it is preferred that the fat/glycerol contain from about 1 to about 6% by weight of emulsion of an oil-water emulsifier such as lecithin, mono- or diglyceride ester.

The emulsion is particularly advantageous as a coating agent because it virtually disappears during dispersion of the composition in aqueous medium. Thus, despite the presence of water-insoluble fat in the reconstitute, this portion of the composition does not adversely affect the appearance or texture of the ultimate product.

Useful for producing this emulsion are animal and vegetable fats which are normally solid or liquid—these latter fats commonly being referred to as "oils". Thus, for example, saturated or unsaturated, and mixtures of various oils and fats are all useful. Exemplary of the materials are corn, cottonseed, soy bean and other commercially available oils and fats. They are ordinarily sprayed onto the pre-formed agglomerates. (Thus, if normally solid, the fat should first be melted and applied at elevated temperature while liquid). The resultant admixture is then preferably blended at a temperature which permits uniform liquid coating.

Depending upon the intended use of the present compositions, it is desired that fat having specific melting points be utilized. In particular, a fat which will exhibit no substantial solidification at the temperature of intended use is preferred. Thus, for example, where the reconstituted aqueous composition is intended to be utilized or consumed at low temperature (i.e. $-5°$ to $20°$ C) as in the case of a milk or like product, it is desirable that the fat be selected from among those which would remain liquid at that temperature. For hot (i.e. $75°$ to $100°$ C) reconstitutes, on the other hand, higher melting and normally solid fats may be employed in the coating agent.

Accordingly, there exist two preferred embodiments in accordance with this invention. For compositions which will be utilized in the production of hot aqueous reconstitutes, fats having a melting point below $50°$ C, more desirably below $10°$ C are utilized. For cold reconstitutes, this component of the emulsion coating agent preferably melts at below $0°$ C, more desirably below $-10°$ C.

In many instances, the coated co-agglomerates of this invention will be utilized in the preparation of composite reconstitutable food materials. Thus, for example, this invention has particular applicability for the production of dry soup, gravy, pudding, salad dressing, beverages (such as malted milks) and like mixes which the consumer can readily convert into useful aqueous products.

The additives which are combined with the present coated co-agglomerates to produce these dry or "instant" mixes, however, are normally readily dispersible and/or soluble themselves. Thus, for example, they commonly include sugar, salt, and other common flavorants as are customary ingredients in such products.

These already dispersible materials neither require, nor interfere with, the mechanism of this invention. Consequently, they may be added to or blended with the coated co-agglomerates having regard solely to the organoleptic character and appearance desired for the reconstituted product. This permits production of complete instant mixes which then require admixture only with water or another aqueous based medium for production of the desired end product.

This invention is further illustrated by the following examples in which all percentages are on the basis of weight unless otherwise indicated.

EXAMPLE 1

A water-dispersible starch composition is prepared as follows.

741 g of pre-gelatinized starch is admixed with 20 g of silicon dioxide having an average particle size of about 0.014 micron. The blending of these constituents is performed in a high shear mixer for ten minutes. An emulsion of 84 g soy bean oil (M.P. — minus $22°$ C), 143 g of glycerol and 12 g liquid lecithin is then sprayed onto the admixture and the blending continued for an additional ten minutes.

5 g of the coated co-agglomerates is placed in one 250 ml beaker and 3.7 g of the same pre-gelatinized starch (an amount equivalent to that in the coagglomerates) in a second 250 ml beaker. 150 ml aliquots of 20° C water are then added to each beaker and the respective contents stirred for twenty seconds by hand.

After mixing, differences between the contents of the two beakers are readily apparent. The beaker containing starch only shows an essentially aqueous phase having large lumps of undispersed starch. The beaker which contains the coated co-agglomerates of this invention, however, shows an essentially homogeneous dispersion. No solid particles are observed.

EXAMPLE 2

A water-dispersible cocoa powder composition is prepared in the same manner as in Example 1. This cocoa powder premix has the following composition:

| | |
|---|---|
| Cocoa Powder | 74.1% |
| Silicon Dioxide (0.007μ) | 2.0% |
| Soybean Oil (M.P. - minus 22° C) | 8.4% |
| Glycerol | 14.3% |
| Lecithin | 1.2% |
| | 100.0% |

1.3 g of the coated co-agglomerates are readily dispersed in 150 ml of 10° C water, whereas 1 g of the same cocoa powder (an equivalent to that in the co-agglomerates) produces significant lumping.

EXAMPLE 3

A sodium caseinate composition is prepared in the same manner as in Example 1. The sodium caseinate premix has the following composition:

| | |
|---|---|
| Sodium Caseinate | 74.1% |
| Silicon Dioxide (0.007μ) | 2.0% |
| Soybean Oil (M.P. - minus 22° C) | 8.4% |
| Glycerol | 14.3% |
| Lecithin | 1.2% |
| | 100.0% |

1.3 g of the coated co-agglomerates and 1 g of sodium caseinate (an equivalent of that in the co-agglomerates) are each mixed with 5 g of sugar and added to beakers containing 150 ml of 10° C water. The results are similar to those obtained in Example 1.

EXAMPLE 4

A xanthan gum composition is prepared in the same manner as in Example 1. The xanthan gum premix has the following composition:

| | |
|---|---|
| Xanthan Gum | 72.1% |
| Silicon Dioxide (0.007μ) | 4.0% |
| Soybean Oil (M.P. - minus 22° C) | 8.4% |
| Glycerol | 14.3% |
| Lecithin | 1.2% |
| | 100.0% |

0.42 g of the coated co-agglomerates and 0.3 g of xanthan gum are each mixed with 7 g of sugar. Upon addition of the resultant composition to 150 ml aliquots of 20° C water, only the composition containing the coagglomerates disperses completely.

EXAMPLE 5

A water-dispersible buttermilk powder composition is prepared in the same manner as in Example 1. The buttermilk powder premix has the following composition:

| | |
|---|---|
| Cultured Buttermilk Powder | 74.1% |
| Silicon Dioxide (0.014μ) | 2.0% |
| Vegetable Oil (M.P. - 0° C) | 8.4% |
| Glycerol | 14.3% |
| Lecithin | 1.2% |
| | 100.0% |

Although 6.7 g of the composition readily disperses in 150 ml of 20° C water, an equivalent amount (5 g) of buttermilk powder alone does not.

EXAMPLE 6

A skimmed milk powder composition is prepared in the same manner as in Example 1. The skimmed milk powder premix has the following composition:

| | |
|---|---|
| Skimmed Milk Powder (Spray Dried) | 82.2% |
| Silicon Dioxide (0.014μ) | 2.0% |
| Soybean Oil (M.P. - minus 22° C) | 6.0% |
| Glycerol | 9.0% |
| Lecithin | 0.8% |
| | 100.0% |

12.1 g of the coated co-agglomerates and 10 g of skimmed milk powder (an equivalent to that in the co-agglomerates) are each mixed with 3 g of pre-gelatinized starch. Upon addition of the resultant compositions to 150 ml aliquots of 20° C water, only the composition containing co-agglomerates disperses completely.

EXAMPLE 7

A water-dispersible soy protein isolate composition is prepared in the same manner as in Example 1. The soy protein isolate premix has the following composition:

| | |
|---|---|
| Soy Protein Isolate | 74.1% |
| Silicon Dioxide (0.014μ) | 2.0% |
| Vegetable Oil (M.P. - minus 10° C) | 8.4% |
| Glycerol | 14.3% |
| Lecithin | 1.2% |
| | 100.0% |

2 g of the coated co-agglomerates disperses into 150 ml of 20° C water, while 1.5 g of the soy protein isolate (an equivalent to that in the co-agglomerates) does not.

EXAMPLE 8

Instant Milk Shake Mix

A powdered instant milk shake premix is prepared utilizing co-agglomerates of the following composition:

| | |
|---|---|
| Pre-Gelatinized Starch | 48.2% |
| Xanthan Gum | 7.2% |
| Cocoa Powder | 20.7% |
| Silicon Dioxide (0.007μ) | 4.0% |
| Soybean Oil (M.P. - minus 22° C) | 6.7% |

| | |
|---|---|
| Glycerol | 11.1% |
| Lecithin | 2.1% |
| | 100.0% |

These co-agglomerates are prepared in the same manner as in Example 1 with starch, xanthan gum and cocoa powder being admixed with silicon dioxide prior to coating with emulsion containing the lecithin. The finished milk shake composition has the following composition:

| | |
|---|---|
| Starch-Gum-Cocoa Premix | 33.3% |
| Sugar | 61.7% |
| Salt | 2.6% |
| Flavoring | 2.4% |
| | 100.0% |

40 g of the milk shake composition is placed into a 300 ml glass. 240 ml of cold milk is then introduced and the contents stirred by hand for 15 seconds. A creamy, thick shake is produced.

EXAMPLE 9

The composition of Example 8 is compared with similar compositions to assess the criticality of its individual constituents. For this purpose, the following samples are dispersed in 240 ml of cold milk.

| | |
|---|---|
| Sample "A": | 40 g of the milk shake composition of Example 8 |
| Sample "B": | 39.4 g of Sample "A" lacking the silicon dioxide constituent |
| Sample "C": | 37.3 g of Sample "A" lacking the glycerol-oil-lecithin coating agent |
| Sample "D": | 36.7 g of Sample "A" lacking silicon dioxide and glycerol-oil-lecithin coating agent |
| Test Results: | Sample "A" disperses well, without formation of lumps. Sample "D" does not disperse at all. Instead, large lumps are produced. Both Samples "B" and "C" are better than Sample "D" in dispersibility and texture. Neither, however, achieves the uniformity of Sample "A". |

I claim:

1. A water-dispersible edible composition comprising an intimate admixture of co-agglomerates of a finely-divided non-dispersible material and a silicon dioxide flow agent, said co-agglomerates having a thin coating of an emulsion comprising edible fat and glycerol over their external surfaces.

2. The composition of claim 1, wherein the emulsion comprises edible fat and glycerol in a weight ratio of from 1:1 to 1:4.

3. The composition of claim 1, in which the co-agglomerates comprise up to 8% by weight of silicon dioxide by weight of non-dispersible material and are coated with from 10 to 35% by weight of emulsion.

4. The composition of claim 3, in which the emulsion comprises 15 to 20% by weight of said co-agglomerates.

5. The composition of claim 1, in which the co-agglomerates comprise from 0.5 to 5% of silicon dioxide by weight of non-dispersible material.

6. The composition of claim 1, in which the emulsion contains an emulsifier.

7. The composition of claim 1, in which said composition additionally contains particulate, water-soluble and dispersible flavorant.

8. The composition of claim 1, in which the non-dispersible material comprises a thickening agent.

9. The composition of claim 1, in which the edible fat has a melting point below 0° C.

10. The process for producing the composition of claim 1 comprising subjecting finely-divided particles of non-dispersible material and silicon dioxide flow agent to high shear mixing to produce an intimate admixture of co-agglomerates and thereafter coating said co-agglomerates with an emulsion comprising edible fat and glycerol.

11. The process of claim 10, in which the coating is performed by spraying and blending the emulsion onto the external surfaces of the co-agglomerates.

12. The process of claim 10, in which the coated co-agglomerates are blended with particulate, water-soluble and dispersible flavorant.

* * * * *